United States Patent Office 3,279,701
Patented Oct. 18, 1966

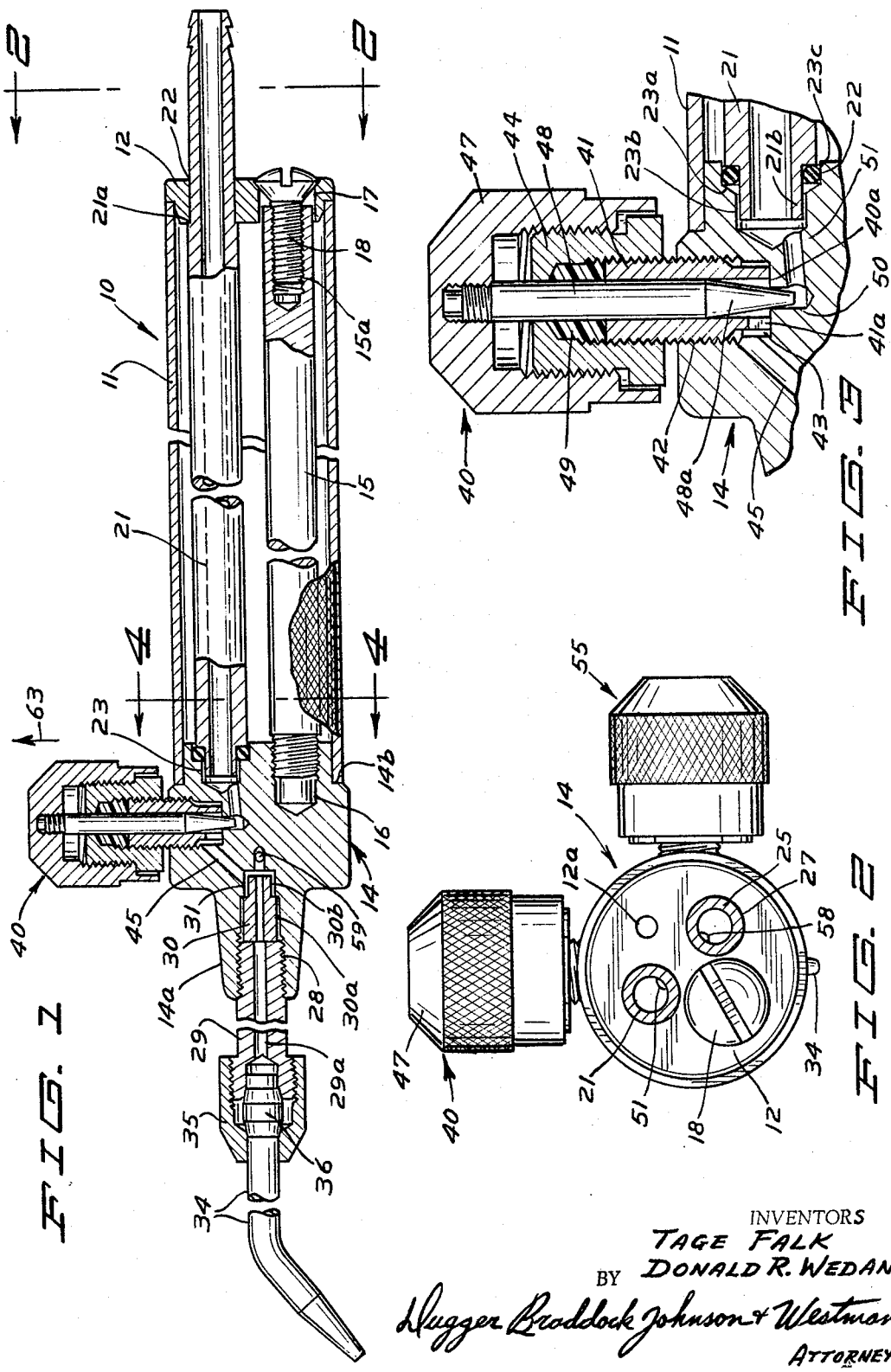

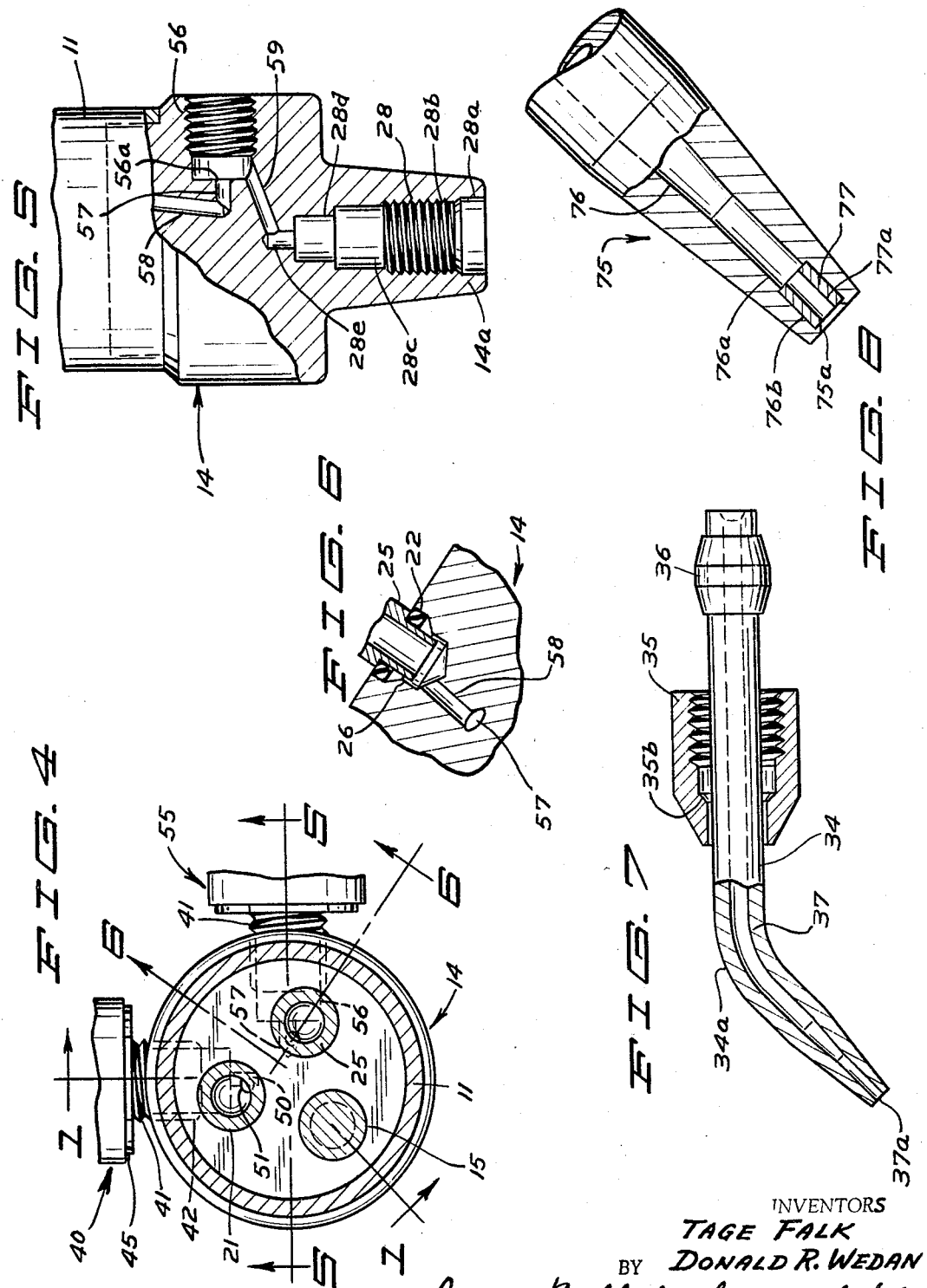

3,279,701
MINIATURE TORCH
Tage Falk, St. Paul, and Donald R. Wedan, Minneapolis, Minn., assignors to Tescom Corporation, Minneapolis, Minn., a corporation of Minnesota
Filed Apr. 21, 1964, Ser. No. 361,421
2 Claims. (Cl. 239—413)

This invention relates to new and novel torch of a very small size. More particularly this invention relates to a new and novel improvements in a torch that provides critical control of a high temperature micro-flame.

One of the objects of this invention is provide a new and novel torch of a relatively small size having controls for making very fine adjustments of the rate of fluid flow therethrough. Another object of this invention is to provide a miniature torch that provides a critical control of the flow of fluid therethrough over a wide range of flow rates. A further object of this invention is to provide sturdy control mechanism on a torch that compensates for ambient atmosphere temperature fluctuations in order to maintain the desired flow rate of fluid through the torch.

An additional object of the invention is to provide a miniature torch having new and novel means for attaching the torch to the body of the torch head. A still further object of this invention is to provide a miniature torch having new and novel control mechanism and a torch tip that provides a better flow pattern, and an easier adjustment of the flame.

Still another object of this invention is to provide a new and novel miniature torch that fits a wide variety of applications in electronic production and repair, dental laboratories, jewelry manufacture or repair, metal sculpturing, ceramics, glass and plastic; for any function requiring soft or hard soldering, brazing, heating or fusion welding, and that also provides a critical control of a high temperature flame.

Other and further objects are those inherent in the invention herein illustrated, described and claimed, and will become more apparent as the description proceeds.

To the accomplishment of the foregoing related ends, this invention comprises the features hereinafter fully described and particularly pointed out in the claims, the following description setting forth in detail certain illustrative embodiments of the invention, these being indicative, however, of but a few of the various ways in which the principles of the inventions may be employed.

In present day technology and particularly in soldering, brazing, heating or fusion welding of very small articles such as to be accomplished in the fields set forth in the objectives, it is highly desirable to provide a torch that is sturdy, relatively inexpensive to manufacture, and at the same time will provide for very fine control of the flow rates of fluid therethrough over relatively wide range of fluid consumption. At the same time it is highly desirable to provide a very fine adjustment for selectively varying the flow rates of the respective gases wherein fluctuations of a few degrees of temperature will not make any substantial change in the fluid flow through the torch. In order to achieve these ends, this invention has been made.

The invention is illustrated by reference to the drawings in which corresponding numerals refer to the same parts, and in which:

FIGURE 1 is a vertical cross sectional view of the torch of this invention generally taken along the line and in the direction of arrows 1—1 of FIGURE 4 other than that portions of the fuel gas conduit and tie rod are now shown in section;

FIGURE 2 is a back end view generally taken along the line and in the direction of arrows 2—2 of FIGURE 1 to shows a back end view of the torch of this invention;

FIGURE 3 is an enlarged fragmentary cross sectional view of a portion of the structure illustrated in FIGURE 1, FIGURE 3 showing the fuel gas control valve assembly and the mounting thereof on the torch head;

FIGURE 4 is a transverse cross sectional view generally taken along the line and in the direction of arrows 4—4 of FIGURE 1, portions of the control valve assemblies being broken away;

FIGURE 5 is an enlarged fragmentary view of the torch head, a portion of which is generally taken along the line and in the direction of arrows 5—5 of FIGURE 4 to illustrate the oxygen passageway;

FIGURE 6 is an enlarged fragmentary cross sectional view of the torch head generally taken along the line and in the direction of arrows 6—6 of FIGURE 4 to illustrate another portion of the oxygen fluid passageway;

FIGURE 7 is an enlarged view of one embodiment of the torch tip, portions of said view being shown in cross section; and FIGURE 8 is an enlarged cross sectional view of the outlet end portion of the second embodiment of a torch tip, portion of said view being shown in cross section.

Referring now in particular to FIGURES 1 and 2 there is illustrated the miniature torch of this invention, generally designated 10, which includes a handle tube 11 that has at least the front portion thereof knurled. The handle tube at one end seats on an annular shoulder of the butt 12 and at the opposite end seats on an oppositely faced annular shoulder 14b of the torch head 14. In order to retain the handle tube, butt and torch head in an assembled condition there is provided a tie rod 15 that at one end is threaded into an aperture 16 in the torch head. The tie rod extends through the handle tube and at the opposite end extends into butt aperture 17 which is of a larger diameter than said tie rod. The opposite end of the tie rod is provided with an aperture for threadedly receiving a screw 18 which is extended through aperture 17 and has a head that bears against the surface of the butt opposite the torch head. The torch butt is provided with a vent aperture 12a that opens into the torch tube.

Also extended through the handle tube and through an aperture 22 of the butt is a fuel gas conduit 21, and the conduit 21 having a shoulder 21a that abuts against the forward surface of the torch butt 12 to prevent said conduit being moved away from the torch head when the torch is in an assembled condition. The back end of the fuel gas conduit is provided with annular ribs for retaining one end of a flexible conduit (not shown), the opposite end of said flexible conduit being connected to a suitable source of fuel gas supply.

The opposite end of the conduit 21 is provided with a reduced outer diametric portion 21b to form a shoulder that seats an O-ring 22 which in turn is adapted to abut against the shoulder 23a of the torch head inlet bore 23 to form a fluid seal therewith. As may be noted from FIGURE 3, bore 23 has a reduced diameter portion 23b that receives the conduit portion 21b and an enlarged diametric portion 23c that receives the O-ring 22 and a small portion of the major diameter portion of the fuel gas conduit. Further the axial length of bore portion 23b is greater than that of bore portion 23a.

An oxygen conduit 25 of the same construction as the fuel gas conduit 21 is provided and mounted in a similar manner, the oxygen conduit at one end having a shoulder that abuts against the torch butt and extended through an aperture 27 formed therein. The opposite end of the conduit 25 and O-ring 22 are seated in the torch head inlet bore 26 in the same manner as that described relative to the seating of the conduit 21 in bore 23.

Through the use of the above described torch body structure, the fluid conduits 21, 25, handle tube 11 and butt 12 may be disassembled from the torch head by merely unthreading screw 18 and pulling the aforementioned elements away from the torch head. This facilitates the assembly and disassembly of said structure.

The end of the torch head opposite the aforementioned bores is formed with an axially elongated, frusto-conical outlet portion 14a having an axially elongated outlet bore 28 formed therein (see FIGURES 1 and 5). The bore 28 is provided with a maximum diameter non-threaded portion 28a for slidably receiving the intermediate non-threaded portion of the tubular tip adaptor 29, portion 28a opening to a bore threaded portion 28b into which one end of the tip adaptor is threaded, and portion 28b opening to an intermediate non-threaded portion 28c which in turn opens to a reduced diameter portion 28d. Portion 28d opens to the minimum diameter portion 28e of the axially elongated torch head bore 28.

Slidably positioned in bore portions 28c, 28d is a nozzle 30 having a maximum diameter portion located in bore portion 28c and a reduced diameter portion 30b located in bore portion 28d. Nozzle portions 30a and 30b form a shoulder that is held in abutting engagement with the shoulder form by bore portions 28c, 28d by the tip adaptor being threaded in the bore 28 to abut against the nozzle. To be noted is that during normal operations of the torch, the cooperating shoulders of the nozzle and bore portions 28c, 28d space the inner axial end of the nozzle from the shoulder formed by bore portions 28d, 28e to permit the passage of fluid from the annular clearance 31 intermediate adjacent peripheral walls of nozzle portion 30b and bore portion 28d to the axial bore provided in the nozzle.

The opposite end of the nozzle bore opens to the tip adaptor aperture 29a which is of a substantially larger diameter. An all metal elongated torch tip 34 is rotatably attached to the forward end of the tip adaptor with one end of the tip channel 37 in fluid communication with the adjacent end of the adaptor aperture 29a. To attach the torch tip to the adaptor and to selectively permit rotation of the tip relative the adaptor, there is provided a compression sleeve 36 on the rearward end of the torch tip as shown in FIGURE 7. The compression sleeve has a tapered surface that abuts against the tip nut shoulder 35b when the tip nut is threaded on the forward end of the adaptor as shown in FIGURE 1. The forward end of the torch tip is bent at 34a, the forward end being provided with an outlet orifice 37a for the fluid channel 37. Through the provision of the structure described for mountingly connecting the torch tip to the tip adaptor, the tip upon slightly unthreading the tip nut may be rotated to direct the flame in the desired direction without having to rotate the torch body. After rotating the tip, the tip nut is again tightened.

In order to control the rate of flow of fuel gas through the torch there is provided a fuel gas control assembly generally designated 40 (see FIGURES 1–4). To facilitate the description of the control assembly, the portions of the torch head and said assembly more closely adjacent the central longitudinal axis of the torch than another portion being described will be referred to by terminology such as "radially inwardly" or "inwardly." However the usage of such terminology is not to infer that the torch head has to have a cylindrical portion as the outer configuration of the torch head can be of varying shapes.

The assembly 40 includes an elongated externally threaded valve sleeve 41 that is threaded into the torch head radially extending aperture 42 to abut against the shoulder formed by said aperture and a smaller diameter channel 50 that constitutes a radial extension of the inner end of the aperture 42. As may be noted from FIGURE 3, the radial inward portions of the valve sleeve and the inner peripheral wall of aperture 42 are nonthreaded and of sufficiently different diameters to provide an annular clearance 43 in the bottom of the aperture, the annular clearance space 43 being placed in fluid communication with the interior of the sleeve by slots 41a provided in said sleeve. A fluid channel 45 is provided in the torch head for placing the annular clearance 43 in fluid communication with the annular clearance space 31 that surrounds reduced diameter portion of the nozzle.

A packing nut 44 having a radially outwardly externally threaded surface and a radially inwardly internally threaded surface is threaded onto the outer end portion of the valve sleeve, there being a valve wheel 47 having an internal threaded portion threadedly mounted on the packing nut. As may be noted from FIGURE 3 the inner non-threaded portion of the valve wheel bore is of an enlarged diameter to permit said wheel being freely turned relative to the polygonal cross sectional portion of the packing nut and at the same time being located concentric thereto. The hub portion of the valve wheel has a threaded portion to threadingly receive the outer end of the radially elongated valve stem 48 and to have the valve stem "bottom" in said valve wheel aperture such that the valve stem does not move independent of the movement of the valve wheel during useage of the torch.

When the valve assembly 40 is in an assembled condition such as illustrated in the drawings, the valve stem extends inwardly from the valve wheel hub portion through the reduced diameter outer portion of the packing nut, through the packing 49 provided between the last mentioned reduced diameter portion and the outer annular surface of the valve sleeve, thence radially inwardly through the interior of the packing sleeve and into the fluid channel 50. The axially intermediate diameter portion of the valve stem forms a close sliding fit with the adjacent hub portion of the packing nut, the packing 49 and the valve sleeve 41.

The radially inwardly tapered end portion of the valve stem extends into the fluid channel 50, and is seatable against the valve seat 40a formed at the juncture of the fluid channel 50 and the torch aperture 42 when the valve wheel has been sufficiently threaded onto the packing nut. In this connecton note that the axial length of mating threads of the valve wheel and the valve sleeve is sufficient that the valve wheel can be threaded on the valve sleeve from the FIGURE 3 valve closed position to a fully open position.

The included angle of the tapered portion plus the diameter of the tapered portion at the position that it engages the valve seat in contrast to the outer knurled diameter portion of the valve wheel and the pitch of the matching thread of the valve wheel and packing nut is such to give a very fine degree of control of the size opening at the valve seat; the diameter of the external threads of the packing nut being many times larger than the diameter of the tapered portion at the position it engages the valve seat. Thus turning the valve wheel a few degrees will cause only slight radial movement of the valve stem (arrow 63 if the valve opening is being increased); it being noted that the valve stem is turned by the valve wheel the same angular amount.

The lower end of the fluid channel 50 opens to one end of the fluid channel 51 which in turn opens to the inner end of the cylinder head bore 23, said bore being in fluid communication with the interior of the fuel gas conduit 21. Thus bore 23 serves as the torch head inlet for fuel gas.

An oxygen control valve assembly 55 of the same construction as the assembly 40 has a valve sleeve 41 threaded into the oxygen control valve aperture 56 of the torch head, see FIGURES 2, 4 and 5. The lower end of the aperture 56 opens to the radially extending oxygen fluid channel 57 which forms a valve seat 56a at the juncture of said channel 57 and aperture 56.

The oxygen control valve assembly has a valve stem with a tapered portion seatable against the valve seat 56a in the same manner as described and illustrated with reference to the structure of FIGURE 3. The oxygen control valve stem serves to alternately block the fluid flow between channel 57 and the aperture 56, and to permit a controlled rate of flow therebetween, there being provided a fluid channel 59 that opens at one end through the lower peripheral wall of the aperture 56 and at the opposite end to the bore portion 28c of the adaptor mounting bore 28.

The inner end of the fluid channel 57 is in fluid communication with the fluid channel 58 which in turn opens to the inner longitudinal end of the torch head bore (torch head oxygen inlet 26) into which the oxygen conduit extends to place the interior of the oxygen conduit 25 in fluid communication with the fluid channel 57. Thus, there is provided an oxygen fluid passageway that at one end opens to the hollow interior of the nozzle 30 through bore portions 28d, 28e, said bore portions being placed in fluid communication with the interior of the oxygen conduit 25 by fluid channel 59, aperture 56 (including slots in the valve sleeve), fluid channels 57 and 58, and aperture 26. The valve stem of the oxygen control valve assembly in cooperation with the valve seats 56a serves to block the flow of oxygen through said passageway and to selectively control the rate of flow of oxygen therethrough in a manner similar to that of the assembly 40 for fuel gas.

With reference to the valve control assemblies of this invention, it is to be mentioned that they are connected to the torch head in a manner to isolate jarring forces on the valve wheel from the valve stem as a result of, for example, dropping the torch such that the valve wheel strikes a concrete floor. This isolation results since, for example, if the valve wheel hits the floor, the jarring force is exerted against the valve wheel which in turn is transmitted through the matching threads of the valve wheel with the packing nut, thence from the internal threads of the packing nut to the valve sleeve, and then from the valve sleeve to the torch head instead of from the valve wheel to the valve stem and thence to the torch head. Additionally the aforementioned structure due to the materials of construction and the construction thereof serve to compensate for changes in temperature such that said temperature changes do not result in any significant change of the size of opening between the valve stem and the valve seat. For example, if with a given valve wheel setting there is a temperature increase; the valve sleeve, the packing nut, and the annular portion of the valve wheel expand in a radial direction 63 to move the outer threaded end of the valve stem in the direction away from its valve seat. However the valve stem also increases in elongated length and accordingly the annular surface of the tapered portion adjacent the valve seat remains in the same relative position as whereby the size of the fluid opening through the valve remains the same. For example the valve stem may be made of stainless steel, and the packing nut, the valve wheel and the valve sleeve of aluminum.

Referring to FIGURE 8 there is illustrated a fragmentary portion of a second embodiment of the torch tip for use with the torch of this invention, the second embodiment being generally designated 75. The torch tip 75 has a fluid channel 76 formed therethrough, the outer end portion 76b of said channel being of a substantially larger diameter than the adjacent portion 76a to form a shoulder. Mounted in channel portion 76b is a synthetic jewel 77 having a central aperture 77a therethrough. Advantageously the member 77 may be a sapphire or garnet watch bearing. A metal portion of the tip may be spun to form a flange 75a for retaining the annular member 77 in position against the shoulder formed at the juncture of passageway portions 76a and 76b, the tip other than for member 77 being of metal. The outlet orifice of member 77 is advantageously of the same diameter as that of tip 34.

Advantages of using bearing 77 is that it provides a better flow pattern in that there are no burrs or etc. at the outlet orifice and it permits a more uniform control of the size of the outlet opening. The foregoing also makes it easier to adjust the flame, and also since the flame is adjacent the bearing, the problem of metal contamination of the flame is overcome. This is particularly important in industries where a small amount of metal contamination produced by a flame burning at a metal output orifice can result in the contamination of the product being worked on.

In using the torch of this invention the oxygen conduit 25 and fuel gas conduit 21 are respectively connected to a suitable source of supply of oxygen and fuel gas (acetylene, hydrogen, LP gas or natural gas). In order to supply suitable fuel gas mixture at the torch tip, the valve wheels of the assemblies 40 and 55 respectively are rotated about the packing nuts in an unthreading direction which results in the valve stems being moved away from the respective valve seats (arrow 63 for assembly 40).

Upon the valve stem of the control valve assembly 40 being moved away from valve seat 40a, fuel gas flow takes place from fluid channel 50, thence into the interior of the valve sleeve and through the slots 41a to the annular clearance space 43, and from the annular clearance space 43 through the channel 45. Fuel gas flows from the annular clearance space at the reduced end of the nozzle radially to the axial space between the nozzle body and the shoulder formed by bore portions 28d, 28e. Likewise upon turning the valve wheel of the oxygen control assembly there is provided an annular opening at the valve seat permitting flow of oxygen from the oxygen conduit 25, through fluid channels 57, 58 and into the interior of the valve sleeve and bore 56, next through the valve sleeve slots, thence through the channel 59 and into bore portion 28e. The fuel gas in flowing from clearance space 31 and the oxygen from bore portion 28e mixes as it passes into the nozzle and thence flows through the tip adaptor and the fluid channel in the tip through to the outlet orifice 37a.

In the event of a flashback, the flame will burn in the fluid channel at a location adjacent the shoulder formed by the nozzle bore and the tip adaptor fluid channel, the nozzle bore being of a smaller diameter. By choosing proper materials for making the nozzle, the heat of the flame adjacent the nozzle will cause the reducing diameter portion 30b to expand axially and thereby cut off gas flow to the nozzle bore.

As an example of a miniature torch of this invention but not otherwise a limitation thereon, the following dimensions are given. For an embodiment of the miniature torch the maximum diameter portion of the torch butt is .625 inch, and the axial length .15 inch. The handle tube axial length is almost three inches while the maximum axial length of the torch head is .93 inch and the maximum diameter thereof .675 inch. The overall axial length of the torch head, handle tube and torch butt in an assembled condition from the forward most edge of the frustoconical portion 14a to the back surface of the torch butt is approximately 3.7 inches. The fluid channel 50 has a maximum diameter of .042 inch at the opening to aperture 42, the axial length of the valve stem being .832 inch and the included angle of the valve stem tapered portion being 30°. The external threads of the packing nut are 5/16—32 UNEF threads. The outlet orifices 37a for a range of sizes of torch tips of a FIGURE 7 construction ranges from about .003 inch to .03 inch. Using a torch tip having an appropriate size outlet orifice, the oxygen inlet pressure and fuel gas pressure in the range of 2–4 p.s.i. at the respective supply line to the conduits, the cubic foot per hour consumption of gas of each gas ranges from .023 to 2.54 when the torch has been adjusted for a stable flame. Such torch tips, having orifice sizes in the aforementioned range, afford an array of flame settings which will weld materials ranging from the size of tiny filaments up to 16 gauge steel and will provide flame temperatures up to 6,300° F. The torch of this invention allows pin point accuracy in the control of the flame, it being noted that with a variation of gas pressure at the inlet of each conduit 21, 25 of a factor of two, and with appropriate torch tips within the range of orifice sizes given, the gas consumption for each gas which provides a stable flame is varied by about a factor of 100. Additionally the torch of this invention is very lightweight and for the structure illustrated in FIGURE 1 and for which the dimensions were given, the weight is only one and one half ounces.

As many widely apparently different embodiments of this invention may be made without departing from the spirit and scope thereof, it is to be understood that we do not limit ourselves to the specific embodiments herein.

What we claim is:

1. A torch comprising a torch head having an oxygen passageway and a fuel gas passageway formed therein, each passageway having an inlet, a fluid conduit for each passageway in fluid communication with the respective inlet, a tubular handle member connected to said torch head and having the fluid conduits passing therethrough, said torch head having a shoulder for seating one end of said handle member, a torch tip, means for attaching the torch tip to the torch head and cooperating with said torch head to place the tip in fluid communication with said passageways, fuel gas control means mountable on the torch head to extend into the fuel gas passageway for selectively blocking the flow therethrough and adjustably controlling the rate of flow therethrough, oxygen control means mountable on the torch head to extend into the oxygen passageway for selectively blocking the flow therethrough and adjustably controlling the rate of flow therethrough, at least one of said passageways having a valve seat and the respective one of said control means including an elongated valve stem having an end portion seatable against said seat, a valve wheel having a hub portion attached to the opposite end of the valve stem to move axially therewith, annular means attached to the torch head and having an intermediate portion of the valve stem extended therethrough for mountingly attaching the valve wheel to the torch head, said valve wheel and annular means having cooperating means for varying the spacing of the valve wheel relative the torch head as the valve wheel is angularly moved about the annular means and thereby move the valve stem to vary the rate of fluid flow through said valve seat, a torch butt having a shoulder portion seatable against the opposite end of said tubular member, a single elongated tie member connected to the torch head and extending within said tubular member, and single means for removably connecting the torch butt to said tie member to removably hold said tubular member and torch head in an assembled condition.

2. A torch comprising a torch head having an oxygen passageway and a fuel gas passageway formed therein, control valve means for each passageway connected to the torch head to cooperate with the respective passageway for controlling the rate of flow through the respective passageway, each passageway having an inlet, an elongated fluid conduit for each inlet, and handle means connected to the torch head for removably connecting said conduits in fluid communication with the respective inlet, each conduit having a reduced diameter portion axially slidably extended into the respective inlet, resilient means on each of the aforementioned reduced diameter portions to removably form fluid seal with the respective inlet, said torch head having an annular shoulder surrounding said inlets, and being of a shorter length than said conduits, said handle means including an axially elongated annular member having one end removably seatable on the aforementioned shoulder, a torch butt having a shoulder removably seatable on the opposite end of said annular member and apertures through which said conduits are extended, each conduit having a reduced diameter portion forming a shoulder to bear against the surface of the torch butt facing the torch head, a first elongated member connected to the torch head and extending within the annular member, and means removably connected to said first member for removably retaining the torch butt in abutting engagement with the annular member and thereby the annular member in abutting engagement with the torch head.

References Cited by the Examiner

UNITED STATES PATENTS

| | | | |
|---|---|---|---|
| 1,151,496 | 8/1915 | Pettis | 158—27.4 |
| 1,280,420 | 10/1918 | Dibble | 158—27.4 |
| 1,940,171 | 12/1933 | Huss | 158—73 |
| 2,231,199 | 2/1941 | Smith | 158—27.4 |
| 2,669,415 | 2/1954 | Gilroy | 251—215 |
| 2,672,186 | 3/1954 | Smith | 158—27.4 |
| 2,888,066 | 5/1959 | Wilson | 158—27.4 |
| 3,085,590 | 4/1963 | McIlhenny | 251—215 X |

FREDERICK L. MATTESON, JR., *Primary Examiner.*

JAMES W. WESTHAVER, *Examiner.*

E. G. FAVORS, *Assistant Examiner.*